United States Patent [19]
Bak

[11] Patent Number: 6,134,627
[45] Date of Patent: *Oct. 17, 2000

[54] THREAD SYNCHRONIZATION IN A COMPUTER CONTROLLED BY AN OBJECT-BASED PROGRAM

[75] Inventor: Lars Bak, Palo Alto, Calif.

[73] Assignee: Sun Microsystems, Inc., Palo Alto, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/743,484

[22] Filed: Nov. 4, 1996

[51] Int. Cl.[7] .......................... G06F 12/00; G06F 12/14; G06F 9/00
[52] U.S. Cl. .......................... 711/6; 711/152; 711/163; 709/100; 709/102
[58] Field of Search ................ 711/1, 4, 6, 119, 711/121, 130, 150, 202, 280, 152, 163; 370/500, 229, 280, 353, 354, 389, 390, 475, 476, 478, 530; 395/406, 527, 381, 382, 800.06; 709/100, 102

[56] References Cited

U.S. PATENT DOCUMENTS

| | | | |
|---|---|---|---|
| 4,525,780 | 6/1985 | Bratt et al. | 364/200 |
| 5,020,080 | 5/1991 | Tanguy et al. | 375/324 |
| 5,060,144 | 10/1991 | Sipple | 364/200 |
| 5,136,712 | 8/1992 | Perazzoli, Jr. et al. | 395/700 |
| 5,379,432 | 1/1995 | Orton et al. | 709/315 |
| 5,414,839 | 5/1995 | Joshi | 395/600 |
| 5,442,758 | 8/1995 | Slingwine et al. | 707/8 |
| 5,598,562 | 1/1997 | Cutler et al. | 709/104 |
| 5,630,136 | 5/1997 | Davidson et al. | 709/106 |
| 5,684,974 | 11/1997 | Onodera | 395/412 |
| 5,701,470 | 12/1997 | Joy et al. | 395/614 |
| 5,727,178 | 3/1998 | Pletcher et al. | 395/412 |
| 5,732,404 | 3/1996 | Johnson et al. | 711/2 |
| 5,822,588 | 10/1998 | Sterling et al. | 717/4 |
| 5,893,912 | 4/1999 | Freund et al. | 707/103 |
| 5,924,098 | 7/1999 | Kluge | 707/100 |

*Primary Examiner*—John W. Cabeca
*Assistant Examiner*—Matthew D. Anderson
*Attorney, Agent, or Firm*—Beyer Weaver & Thomas, LLP

[57] ABSTRACT

A method for synchronizing threads in a computer operating under control of a program written in an object-based computer programming language provides for a first thread to lock an object by moving the object header to a stack address and replacing the header with the stack address. The first thread unlocks the object by returning the header to its associated memory location. Second and subsequent threads attempting to access a locked object detect the presence of the stack address in the header memory location and suspend their attempts to access the object. When using aligned stacks, all stack addresses will be even, and all object-headers will be odd. Threads efficiently check the status of the object by testing the least significant bit. A preferred method is implemented in a "JAVA" just-in-time compiler of a "JAVA" virtual machine.

21 Claims, 2 Drawing Sheets

THREAD SYNCHRONIZATION IN A COMPUTER CONTROLLED BY AN OBJECT-BASED PROGRAM

BACKGROUND

The invention relates to the field of electronic computers, and more particularly, to the control of computer operation by instructions of object-based programs. In a specific application, the invention relates to methods and apparatus for synchronizing concurrent and cooperative threads.

Computers operate under the control of programmed instructions. Computer programmers typically write computer programs as source code in an alpha-numeric text format that a skilled person can relatively-easily read and understand. Other programs, including compilers, convert these text-files into binary machine-language instructions which will directly control a computer's central processing unit ("CPU"). Each model (or series) of computer typically has a unique set of machine-language instructions dictated by the hardware design of the CPU, and compilers and interpreters typically convert a source code program to the machine-language instructions of a particular model (or series) of computer.

Standard programming languages have developed so that different programmers can write programs independently of the machine code instructions of the computer on which the program will ultimately run. An object-based programming language supports objects as a language feature. An object has a set of "operations" and a "state" that remembers the effect of the operations. Objects may be contrasted with functions, which have no memory. Function values are completely determined by their arguments, and are precisely the same for each invocation. In contrast, the value returned by an operation on an object may depend on the object's state as well as the operation's arguments. An object may learn from experience, its reaction to an operation being determined by its invocation history. Further background information regarding object-based language can be found in "Dimensions of Object-Based Language Design," by Peter Wegner, presented at OOPSLA'87, Object-Oriented Programming Systems, Languages and Applications, pp. 168–182, Orlando, Fla., October, 1987 (proceedings published by Association for Computing Machinery, Inc., New York, N.Y.).

A "thread" is a single sequential flow of control within a program. A thread has its own execution stack where method activations reside. When a method is activated, an activation is "pushed" onto the stack. The activation is "popped" when the method returns. Since one activation can activate another method, the stack has first-in-last-out behavior. In a system, threads can either be "cooperative" or "concurrent". Threads are said to be "cooperative" if only one thread has total control until it voluntary relinquishes control. Threads are said to be "concurrent" if they are not cooperative.

In an object-based program, a thread may execute processes that involve multiple objects. Similarly, multiple threads may attempt to execute processes that involve a single object. It is desirable, at times, to prevent all but one thread from executing a process that involves a particular object. An object will be said here to be "locked" when only one thread is permitted to operate on that object, and an object will be said to be "unlocked" otherwise. A thread will be said to hold a lock on an object if it is the only thread permitted to operate on that object. Thread synchronization will be said to be a process by which threads interact to (1) check the status of objects (as locked or unlocked), (2) obtain and remove locks, and (3) avoid operations on locked objects (except for the thread that holds a lock on an object).

One object-based language that seeks to support synchronization is "JAVA". "JAVA" has been defined according to a high-level syntax and semantics. See "The Java Language Specification", by James Gosling, Bill Joy, and Guy Steele, ISBN 0-201-63455-4 and "The Java Virtual Machine Specification", by Tim Lindholm and Frank Yellin, ISBN 0-201-63452-X. However, such high level definitions and descriptions do not completely specify compilers and or interpreters needed to run "JAVA" programs on real platforms. In particular, the high-level definitions and descriptions do not describe particular methods for thread synchronization and object locking.

SUMMARY

An object of the present invention is to provide an efficient method and apparatus for synchronizing threads in a computer operating under control of an object-based program.

A further object of the invention is to provide a "JAVA" execution engine with efficient thread synchronization.

A further object of the invention is to provide a method and apparatus for locking objects in a computer operating under control of an object-based program.

A further object of the invention is to provide a "JAVA" execution engine with efficient object locking.

These and other objects are provided in a computer operating under control of an object-based program by providing a "monitor lock" for each object. In the preferred embodiment, objects are structured with headers. When locking an object, a first thread copies the object header from its loaded location in memory onto the thread's stack, and replaces the object header with a pointer to the memory location in the stack to which the header has been copied. A second thread attempting to access the object first attempts to read the header from the object, but instead finds only a pointer to the stack. The fact that the header is not present indicates to the second thread that the object is locked, and the second thread suspends its attempt to access the object. When unlocking the object, the first thread returns the header from the stack to the object's loaded location in memory. Thereafter, a second thread attempting to access the object will read and recognize the header, and the presence of the header indicates that the object is not locked. In a preferred implementation, the last bit of every valid header will be the value one, and the last bit of every pointer location in the stack will be the value zero. A second thread can test the status of the object (locked or unlocked) by testing the last bit of the object header.

BRIEF DESCRIPTION OF THE DRAWINGS

The invention will be described below with reference to attached drawings in which.

DETAILED DESCRIPTION OF THE PREFERRED EMBODIMENTS

The organization, operation, advantages and objects of the invention can be more fully appreciated from the following description. A preferred embodiment will be described with respect to a computer operating under control of a "JAVA" program. The preferred embodiment of the invention can best be appreciated with an understanding of the "JAVA" execution environment.

The "JAVA" Execution Environment

Figure 1:
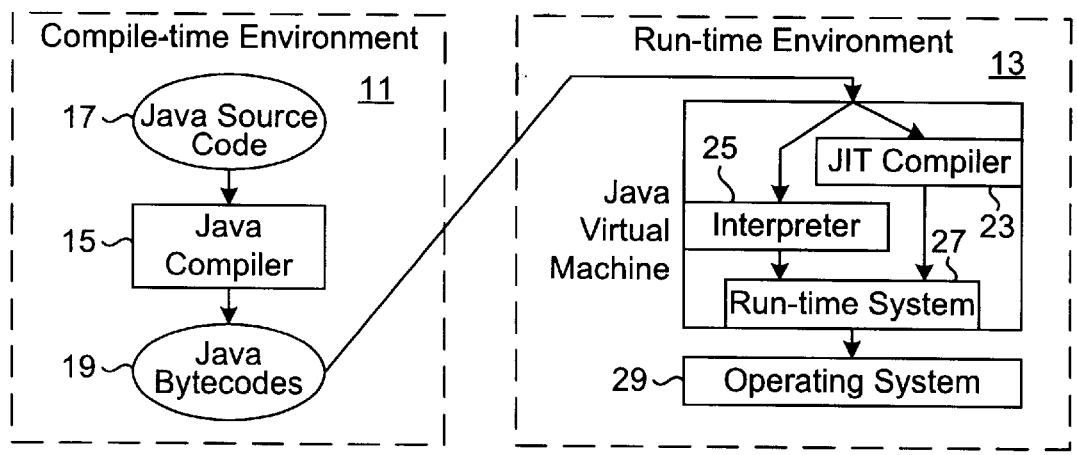
FIG. 1 is a symbolic drawing of relationships between the "JAVA" compile-time environment and the "JAVA" runtime environment.

Executing a "JAVA" program is a two stage process. FIG. 1 is a symbolic drawing of relationships between the "JAVA" compile-time environment 11 and the "JAVA" run-time environment 13. In the compile-time environment 11, a "JAVA" compiler 15 translates the "JAVA" source code 17 into "JAVA" bytecodes 19. Typically, a programmer will compile the source code 17 at the time the source code is written. The bytecodes 19 can then be reproduced, downloaded, or otherwise distributed to a user. Bytecodes are platform-independent in the sense that they can be executed on any model of computer with a "JAVA" virtual machine that is designed for the particular computer model.

In the run-time environment 13 (e.g., at an end-user's computer), a "JAVA" "virtual machine" 21 executes the program by first downloading the bytecodes 19 and then executing the bytecodes 19. The virtual machine 21 either (1) interprets the bytecodes directly, or (2) compiles the bytecodes into machine instructions which in turn are executed.

When implemented with an interpreter, an interpreter reads one bytecode at a time and performs the operation defined by that bytecode. The interpreter continues running while consuming the bytecodes along the execution path and performing the associated operations.

When implemented with a compiler, the "JAVA" virtual machine 21 compiles the methods containing the bytecodes 19 into machine instructions. In a just-in-time ("JIT") "JAVA" compiler, the compilation of a method is delayed until that method is about to be executed. The runtime system 27 activates the compiler 23 when a call destination is an uncompiled method. The JIT compiler 23 generates machine instructions from "JAVA" bytecodes 19 and immediately executes those machine-language instructions. The generated machine instruction are only stored in the virtual machine's internal memory and are discarded when the virtual machine 13 terminates. General operation of the JIT compilers and interpreters are standard and are described in the "JAVA" White Paper.

Semantically, the "JAVA" source code language supports thread synchronization in two constructs: "synchronized methods" and "synchronized statements." The locking and unlocking processes are transparent to the "JAVA" programmer. The programmer writes a program using "JAVA" synchronized method and synchronized object statements, and the "JAVA" virtual machine performs the necessary steps to implement synchronization in accordance with the present invention as discussed more fully below.

Bytecodes involved in synchronized methods are InvokeVirtualMethod (182), InvokeNonVirtualMethod (183), InvokeStaticMethod (184), and InvokeInterfaceMethod (185). Before invoking a synchronized method, the current thread attempts to obtain exclusive access to an object. If the method is static, the lock is on the class object, otherwise the lock is on the receiver object.

Bytecodes involved in synchronized statements are MonitorEnter (195) and MonitorExit (196). The synchronized statement computes a reference to an object, then the current thread attempts to obtain exclusive access to that object. When granted the body is executed whereafter the object is unlocked.

Threads

Object locking provides a mechanism for a first thread to maintain control over an object until the first thread has completed its processing on that object, and can be used for both cooperative-thread environments and for concurrent-thread environments.

Object Locking

Figure 2:
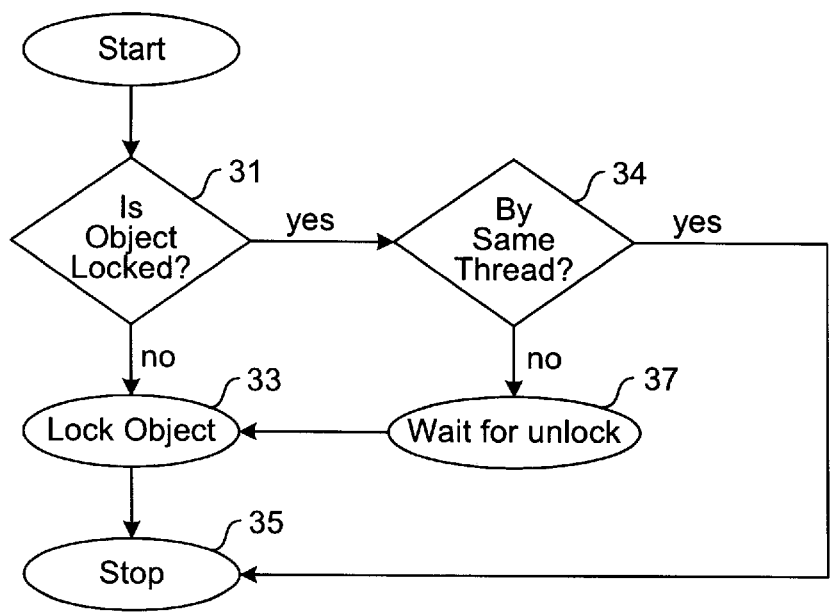
FIG. 2 is a flowchart depicting object locking.

FIG. 2 is a flowchart depicting object locking. In a decision step 31, the thread determines whether the object is locked. If the object is not locked, the current thread can acquire exclusive access rights to the object in step 33. If the object was previously locked by the current thread (step 34), then the object locking process stops (step 35) and execution of the thread continues. If the object was (and continues to be) locked by another thread, the current thread waits (step 37) for the object to be unlocked before continuing.

Figure 3:
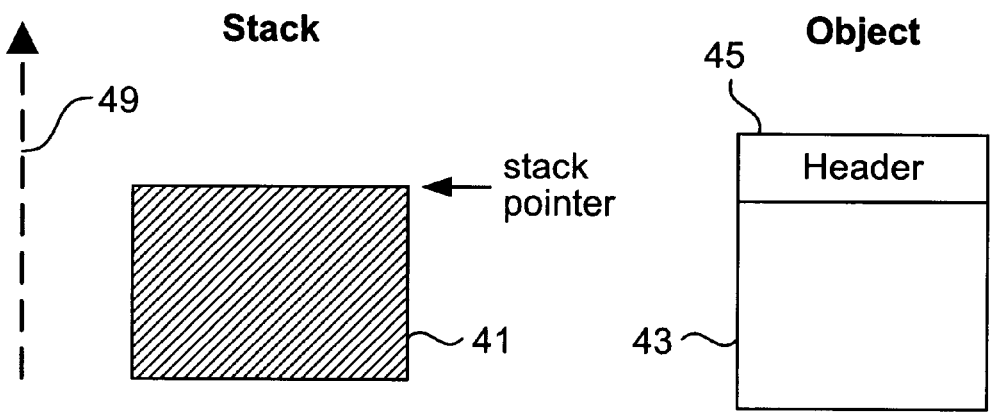
FIG. 3 is a symbolic drawing of a computer stack and object before locking.

FIG. 3 is a symbolic drawing of a computer stack 41 and object 43 before locking. All objects 43 have an object-header 45 occuping one word for storing object-related information, such as identity hash values, garbage collection information etc. The dashed arrow 47 designates an ordered sequence of memory addresses. In a preferred design, the least significant bit of the header 45 is used for synchronization. Accessing information in the object-header 45 now requires a test since the object-header might reside in the stack. The pseudo code below shows how to implement the function "identity hash."

```
int identity_hash() {
    return is_header_word_even()
        ? header_word()->raw_identity_hash() //
          use displaced header
        : raw_identity_hash ();
}
```

The tag bit is a status bit that is set to a first state for all unlocked headers. Use of the tag bit for object locking will be described in further detail below.

Figure 4:
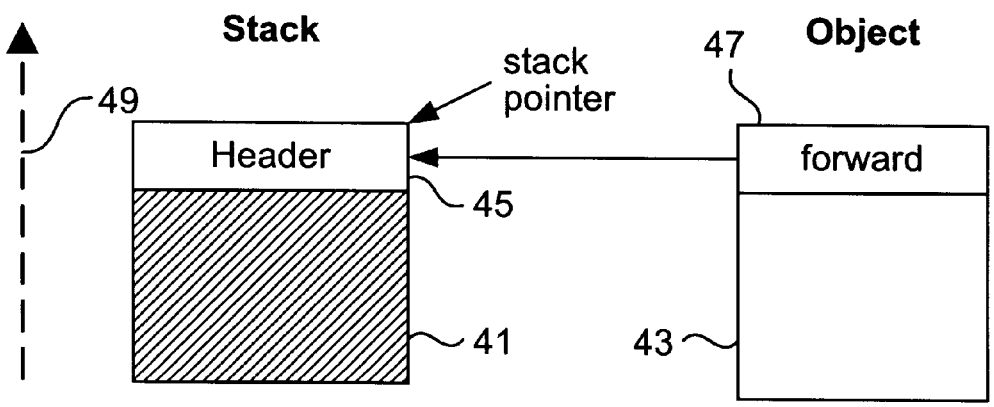
FIG. 4 is a symbolic drawing of a computer stack and object after locking.

FIG. 4 is a symbolic drawing of a computer stack 41 and an object 43 after locking. An object is locked by displacing the object header 45 from the object's memory location on top of the current thread's stack. In the object's memory location, the header is replaced with a memory pointer 47 ("FORWARD") to the location in the stack to which the header 45 has been displaced. When unlocking, the header 45 is restored from the stack to the object. Using this scheme, a thread can attempt to read the header prior to accessing the object. The thread would not find the header in the header's memory location, and the very fact that the header has been moved indicates that the same or another thread has locked the object.

The original header word preferably will be distinguishable from a stack address quickly, so that another thread can efficiently determine that the object is locked by inspecting the memory location of the header word. Tagging is one scheme for distinguishing header words from forwarding pointers. If the stack is always word aligned, all stack addresses are even. When the tag bit for all objects is 1, a thread can quickly check whether the information in the memory location of the object header is odd or even.

Moving the header word to the stack works especially well for "JAVA", because locking and unlocking always happens within one stack activation cycle. Operations on the object-header are infrequent, therefore, the additional time overhead caused by checking the header is insignificant.

Detailed implementations of object locking will now be described for a JIT compiler in a "JAVA" virtual machine. A first embodiment will be described for a cooperative-thread implementation, and a second embodiment will be described for a concurrent-thread implementation. The sequences described below may be implemented as instructions to be generated by a JIT compiler. However, it will be appreciated that the sequences could be adapted as part of an interpreter-based virtual machine.

Cooperative Threads

The following pseudo code describes the synchronization for entering and exiting synchronized methods or synchronized statements for cooperative threads. The PROLOGUE code is performed prior to accessing an object. The EPILOGUE code is performed prior to exiting an object. The characters "//" delineates comments.

```
prologue:
    if (obj->header()->is_unlocked()) {
        // object is unlocked
        stack->push(obj->header());
        obj->set_header(stack->top_address ());
    } else if (in_same_13 process(obj->header(), stack->top_address())) {
        // object is locked by current thread
        stack->push (NULL);
    } else {
        // object is locked by other thread
        queue_myself_and wait for access();
        goto prologue;
    }
epilog:
    if (stack->top() ?= NULL) {
        obj->set_header(stack->top());
    }
    stack->pop ();
```

The following is a specific example of "JAVA" source code and the resultant machine code instructions for a method "Next" which operates on the class "Test." Each instance of Test has a counter. Whenever the method Next operates on such an instance, the counter is incremented and the counter value is returned. The method is a synchronized method. The "JAVA" source code is as follows.

```
class Test {
    int counter;
    Test() { counter = 0; }
    public synchronized int next() {
        counter := counter + 1;
        return counter;
    }
}
```

By way of example, the following machine code can be produced for an "INTEL" CPU by compiling the class Test. The symbol ";" delineates comments which identify the prologue and epilogue portions of the machine code.

```
_entry_point_for_next:
    ; Standard code for setting up a method actication
    pushl   %ebp
    movl    %ebp, %esp
    ; Synchronization proiogue
    ; %ecx points to the object
    ; %ebx is used as a temporary register
    movl    %ebx, [%ecx]        ; value = obj->header();
    testl   %ebx, 0x1           ; if (!value->is_unlocked())
    jne     _locked             ;   goto _locked;
    pushl   %ebx                ; stack->push(value);
    movl    [%ecx], %esp        ; obj->set_header
                                  (stack->top_address())
_end_prologue:
    ; Code for method body
    movl    %eax, [%ecx+08]     ; load counter
    inc     %eax                ; increment counter
    movl    [%ecx+06], %eax     ; store counter
    ; Synchronization epilogue
    ; %ecx points to the object
    ; %ebx is used as a temporary register
    opl     %ebx                ; value = stack->pop();
    testl   %ebx, %ebx          ; if (value == 0)
    je      _cont_epilogue      ;   goto _cont_epi-
                                  logue;
    movl    [%ecx], %ebx        ; obj->set header(value)
_end_epilogue:
    ; Standard code for removing the method actication
    movl    %ebp, %esp
    popl    %ebx
    ret
_locked:
    push    0                   ; push result
    push    _end_epilogue       ; push return address
    jmp     _wait_or_re-        ; call C routine for the uncommon
            enter                 case
```

Concurrent Thread

The following pseudo code describes the synchronization for entering and exiting synchronized methods or synchronized statements for concurrent threads. The implementation assumes the platform has an atomic swap operation for interchanging two variables such as in most "INTEL" processors. In the pseudo code, a variable initialized with a sentinel value is swapped with the object header. If the variable still contains the sentinel value after the swap, another thread is inspecting the object and the proglogue must be restarted. The sentinel value is chosen so that it looks like a locked value (e.g., the least significant bit is zero (0)) and it is distinguishable from any stack address. The value zero ("0") could be used as the sentinel value.

```
prologue:
    value := sentinel;
    swap(obj->header(), value);
    if (value->is_unlocked()) {
        // object is unlocked
        stack->push(value);
        obj->set_header(stack->top_address());
    } else if (value == sentinel) {
        // another thread is looking at the object
        goto method_prologue;
    } else if (in_same_process(value, stack->top_address())) {
        // object is locked but by current thread
        obj->set_header(value);
        stack->push (NULL);
    } else {
        // object is locked by other thread
        swap(obj->header(), value);
        queue_myself_and wait for access();
        goto method_prologue;
    }
epilog:
    if (stack->top() ?= NULL) {
        do {
            value := sentinel;
```

```
    swap(obj->header(), value);
    while (value ?= sentinel);
        obj->set_header(stack->top());
}
stack->pop();
```

Many advantages and variations of the invention should now be fully appreciated. First, the approach described above uses a minimum of space for overhead; the space cost per object is only 1 bit. Second, the approach described above uses a minimum of execution speed overhead; only a few machine instructions are executed, eliminating Operating-System-level synchronization. On an "INTEL" platform, entering and leaving a synchronized method on an unlocked object is 9 machine code instructions.

After learning of the embodiments described above, people practicing in this art will be able to make variations that fall within the spirit and scope of the invention. The embodiments described above are exemplary but not intended to limit unduly the scope of the invention as defined by the following claims.

What is claimed is:

1. A method for controlling operations on an object in a computer operating under control of an object-based program, said object having an object header, an associated operation, and an associated state characteristic, the object header being integrally associated with the object, said method comprising:

establishing the object in a memory region, wherein a portion of the memory region is associated with the object header;

placing a predetermined pattern into the portion of the memory region associated with the object header using a first thread, wherein placing the predetermined pattern into the portion of the memory region that is associated with the object header locks the object;

attempting to access the object using a second thread; and at least temporarily suspending access to the object by the second thread in response to the presence of the predetermined pattern in the portion of the memory region that is associated with the object header, wherein the second thread effectively determines that the predetermined pattern is present in the portion of the memory region that is associated with the object header.

2. The method of claim 1 further including moving the object header to a stack associated with the first thread.

3. The method of claim 1 further including swapping the object header with an address in a stack associated with the first thread.

4. The method of claim 1 wherein the predetermined pattern includes at least one bit uniquely identifying the pattern as not that of any object header.

5. The method of claim 1 wherein the predetermined pattern includes a single bit uniquely identifying the pattern as not that of any object header.

6. The method of claim 1 further including:

copying the object header to a second memory location; and placing an address of the second memory location into the memory region associated with the object header.

7. The method of claim 6 wherein:

the second memory address has a first value in a predetermined bit position; and the object header has a second value in the predetermined bit position.

8. The method of claim 6 wherein:

the predetermined pattern is an address location of a stack associated with the first thread; and all stack addresses contain at least one unique bit pattern relative to all object headers.

9. The method of claim 1 wherein placing the predetermined pattern into the portion of the memory region associated with the object header using the first thread locks the object such that substantially only the first thread has access to the object.

10. A method as recited in claim 1 further including:

removing the predetermined pattern from the portion of the memory region associated with the object header using the first thread, wherein removing the predetermined pattern from the memory region associated with the object header unlocks the object.

11. A method as recited in claim 10 further including:

reattempting to access the object using the second thread; and locking the object using the second thread.

12. A method as recited in claim 11 wherein locking the object using the second thread includes placing the predetermined pattern into the portion of the memory region associated with the object header using the second thread.

13. A method for controlling operations on an object in a computer operating under control of an object-based program, said object having an object header, said method comprising:

establishing the object in a memory region, wherein a portion of the memory region is associated with the object header;

placing a predetermined pattern into the portion of the memory region associated with the object header using a first thread, wherein placing the predetermined pattern into the portion of the memory region that is associated with the object header locks the object;

attempting to access the object using a second thread;

at least temporarily suspending access to the object by the second thread in response to the presence of the predetermined pattern in the portion of the memory region that is associated with the object header, wherein the second thread effectively determines that the predetermined pattern is present in the portion of the memory region that is associated with the object header;

moving the object header to a second memory location.

14. A virtual machine arranged to execute program instructions from an object-based language, the virtual machine comprising:

a plurality of objects, each object nominally including an object header and a body, each object further including an operation and a state characteristic, said object header including information stored in a first region of memory, wherein said body is stored in a second region of memory; and a plurality of threads, each thread of the plurality of threads having an associated stack, multiple ones of said plurality of threads being arranged to attempt to access a common one of the objects, each thread of the multiple ones of the plurality of threads being prevented from accessing the common one of the objects when the first region of memory associated with the object header of the common one of the objects contains a predetermined pattern, each thread of the multiple ones of the plurality of threads further being arranged to determine when the first region of memory associated with the object header of the common one of the objects contains the predetermined pattern, wherein the predetermined pattern identifies a particular thread selected from the plurality of threads as having access to the object.

15. A virtual machine arranged to execute program instructions according to claim 14 further including:

a first thread selected from the plurality of threads, the first thread being arranged to place the predetermined pattern in the first region of memory associated with the object header of a first object selected from the plurality of objects, wherein the first thread is the particular thread; and a second thread selected from the plurality of threads, the second thread being arranged to inspect the first region of memory associated with the object header of the first object, wherein the second thread is further arranged to determine when the predetermined pattern is present in the first region of memory associated with the object header of the first object.

16. A virtual machine arranged to execute program instructions according to claim 15 wherein the second thread is further arranged to suspend access by the second thread to portions of the first object not including the first region of memory associated with the object header of the first object when the predetermined pattern is in the first region of memory associated with the object header of the first object.

17. A virtual machine arranged to execute program instructions according to claim 14 further including:

a first thread selected from the plurality of threads, the first thread being arranged to place the predetermined pattern in the first region of memory associated with the object header of a first object selected from the plurality of objects, the predetermined pattern being arranged to indicate that the first object is locked, wherein the first thread is the particular thread; and a second thread selected from the plurality of threads, the second thread being arranged to inspect the first region of memory associated with the object header of the first object, wherein the second thread is further arranged to determine when the first object is locked.

18. A method for controlling operations on an object in an object-based computing system, the object having an object header integrally associated with the object, an operation, and a state characteristic, the method comprising:

establishing the object in a memory region, wherein establishing the object in the memory region includes establishing the object header in the memory region;

placing a predetermined pattern into the object header, the predetermined pattern being placed into the object header using a first thread, wherein placing the predetermined pattern into the object header locks the object;

accessing the object header using a second thread; and at least temporarily suspending access to the object by the second thread in response to the presence of the predetermined pattern in the object header.

19. A computer program product for controlling operations on an object in an object-based computing system, the object having an object header integrally associated with the object, an operation, and a state characteristic, the computer program product comprising:

computer code that establishes the object in a memory region, wherein a portion of the memory region is associated with the object header;

computer code that places a predetermined pattern into the portion of the memory region associated with the object header, the predetermined pattern being placed into the portion of the memory region associated with the object header using a first thread, wherein placing the predetermined pattern into the portion of the memory region associated with the object header locks the object;

computer code that accesses the portion of the memory region associated with the object header using a second thread;

computer code that temporarily suspends access to the object by the second thread in response to the presence of the predetermined pattern in the portion of the memory region associated with the object header; and a computer readable medium that stores the computer codes.

20. A method for controlling operations on an object in a computer operating under control of an object-based program, the object including an object header, an associated operation, and an associated state characteristic, the method comprising:

establishing the object in a memory region, wherein the object header is at least temporarily present in a portion of the memory region, the portion of the memory region being associated with the object header;

moving the object header from the portion of the memory region associated with the object header, wherein the object header is moved to a stack location, the stack location being associated with a first thread;

placing a predetermined pattern into the portion of the memory region associated with the object header using the first thread, wherein placing the predetermined pattern into the portion of the memory region that is associated with the object header locks the object;

attempting to access the object using a second thread; and at least temporarily suspending access to the object by the second thread in response to the presence of the predetermined pattern in the portion of the memory region that is associated with the object header, wherein the second thread effectively determines that the predetermined pattern is present in the portion of the memory region that is associated with the object header.

21. A method for controlling operations on an object in a computer operating under control of an object-based program, the object including at least an object header and an associated operation, the method comprising:

establishing the object in a memory region, wherein the object header is at least temporarily present in a portion of the memory region, the portion of the memory region being associated with the object header;

moving the object header from the portion of the memory region associated with the object header, wherein the object header is moved to a stack location on a stack associated with the first thread;

placing a predetermined pattern into the portion of the memory region associated with the object header using the first thread, wherein placing the predetermined pattern into the portion of the memory region associated with the object header identifies the first thread as having access to the object;

attempting to access the object using a second thread, wherein attempting to access the object using the second thread includes determining when the predetermined pattern is present in the portion of the memory region associated with the object header using the second thread; and at least temporarily suspending access to the object by the second thread in response to the presence of the predetermined pattern in the portion of the memory region that is associated with the object header when the second thread determines that the predetermined pattern is present in the portion of the memory region that is associated with the object header.

* * * * *